3,178,334
SAFETY-GLASS LAMINATE
Chester Griswold Bragaw, Jr., West Chester, Pa., and Egon Orowan, Belmont, Mass., assignors to E. I. du Pont de Nemours and Company, Wilmington, Del., a corporation of Delaware
No Drawing. Filed Sept. 14, 1961, Ser. No. 137,995
5 Claims. (Cl. 161—165)

This invention relates to a novel and improved safety-glass laminate.

Safety-glass laminates used for automobile windshields conventionally are formed from two sheets of glass about 0.120 inch in thickness each and an interlayer of polyvinyl butyral about 0.015 inch thick. A discussion of the requirements of such safety-glass can be found in U.S. Patent No. 2,946,711, issued July 26, 1960, which patent also illustrates an improvement over the properties of conventional safety-glass. Another patent illustrative of work in this field is U.S. Patent No. 2,526,728, issued October 24, 1950.

It is an object of this invention to provide a safety-glass laminate having improved safety features. It is another object of this invention to provide a safety-glass laminate having improved safety features over a broad temperature range.

The above objects of the invention are accomplished by using a composite interlayer formed from a plurality of polyvinyl butyrals having different hydroxyl contents.

Polyvinyl butyral is formed by reacting butyraldehyde with polyvinyl alcohol. The alcohol groups left unreacted are calculated as the percent vinyl alcohol remaining in the polymer. Present-day safety-glass laminates are made using a plastic interlayer whose base resin is composed of a polyvinyl alcohol partially condensed with butyraldehyde so that it contains from 15% to 30% of unreacted hydroxyl groups calculated as weight percent of vinyl alcohol, by weight of ester groups calculated as weight percent of vinyl acetate, and the remainder acetal groups calculated as vinyl butyral. This plastic interlayer is commonly called "polyvinyl butyral," or more exactly "partial polyvinyl butyral." The plasticizer employed in the present invention is generally a water-insoluble ester of a polybasic acid or of a polyhydric alcohol. Particularly desirable plasticizers for use in the present invention are triethylene glycol di(2-ethyl butyrate), dibutyl sebacate, di(beta-butoxyethyl) adipate, and dioctyl phthalate. Other suitable plasticizers include triethylene glycol fully esterified with a mixture of 80–90% caprylic acid and 10–20% capric acid as described in U.S. Patent 2,372,522, dimethyl phthalate, dibutyl phthalate, di(butoxyethyl) sebacate, methyl palmitate, methoxy ethyl palmitate, triethylene glycol dibutyrate, triethylene glycol diacetate, tricresyl phosphate, triethyl citrate, dibutyryl lactate, ethyl para-toluene sulfamide, dibutyl sulphone, lauryl alcohol, oleyl alcohol, glycerol triricinoleate, methyl lauroyl glycolate, butyl octanoyl glycolate, and butyl laurate. The above list of plasticizers are suitable for use in the present invention but do not represent all the known plasticizers which are suitable; such a list would be impractical and would serve no purpose as one skilled in the art can readily select a suitable plasticizer from the many already known. It has been found preferable to use from 34 parts to 52 parts of plasticizer for every 100 parts by weight polyvinyl butyral for the purposes of the present invention.

It is known that the break height of safety-glass laminates, employing polyvinyl butyral as an interlayer, is very temperature-sensitive. In fact, the break height at room temperature is about double that at either 0° F. or 120° F. In order to get better uniformity of behavior the present invention utilizes a plurality of interlayer sheets of polyvinyl butyral having different hydroxyl contents. The temperature at which the peak strength is obtained has been found to vary with the proportion of hydroxyl groups in the polyvinyl butyral interlayer, at a given plasticizer level. By utilizing two polyvinyl butyral sheets having different hydroxyl contents, i.e., differing by 2.5% or more, and hence different peak strength temperatures, a greater temperature range of high strength is obtained. Furthermore, quite unexpectedly, it has been found that if one compares a laminate formed according to the present invention with a laminate having an interlayer thickness equal to the thickness of the two interlayers of the present invention, and having a hydroxyl content about equal to the average hydroxyl content of the two polyvinyl butyral interlayers of the present invention, the laminate of the present invention will exhibit higher strength values than will the laminate having a single interlayer, at substantially all temperatures at which the laminates are tested.

The following examples in which all parts are given by weight, unless otherwise stated, illustrate specific embodiments of the invention.

EXAMPLE I

A safety-glass laminate was prepared using standard thickness glass 0.120 inch thick as the exterior laminae. The interior lamina was formed by superimposing one 15 mil thick sheet of polyvinyl butyral having a hydroxyl content of 23.4% calculated as vinyl alcohol plasticized with 45.3 parts of triethylene glycol di(2-ethyl butyrate) per 100 parts polyvinyl butyral, over one 15 mil thick sheet of polyvinyl butyral having a hydroxyl content of 20.9% calculated as polyvinyl alcohol plasticized with 45.1 parts of triethylene glycol di(2-ethyl butyrate) per 100 parts polyvinyl butyral. A series of these laminae were pressed together in the conventional way to form a series of safety-glass sheets each 12 inches square. A series of control samples 12 inches square was prepared using 0.120 inch thick glass outside laminae and an interlayer of 30 mil thick polyvinyl butyral with a hydroxyl content average of 22.1% calculated as polyvinyl alcohol and plasticized with about 45.3 parts triethylene glycol di(2-ethyl butyrate) per 100 parts polyvinyl butyrate. In the following strength tests, shown in Table No. I, the composite sheet was struck from the side having the hydroxyl content of 23.4% calculated as polyvinyl alcohol. The drop heights recorded are those which produced a 2 inch tear in the safety-glass using a two pound solid steel ball.

*Table No. I*

| Temperature | | Break Height, ft. | |
|---|---|---|---|
| °C. | °F. | 30 Mil Control | Two 15 Mil Composite |
| −18 | 0 | 3.5 | 8.6 |
| 0 | 32 | 17.6 | 21.0 |
| +16 | 61 | 23.2 | 27.2 |
| +25 | 77 | 26.5 | 26.8 |
| +30 | 86 | 25.5 | 26.2 |
| +40 | 104 | 20.5 | 24.2 |
| +49 | 120 | 14.2 | 11.1 |

The strength of the composite was not isotropic. The above laminates when struck from the side having the hydroxyl content of 20.9% calculated as polyvinyl alcohol had a break height of 4.5 ft. at −18° C. as opposed to 8.6 ft. when struck from the other side. This in no way decreases the utility of the invention since the most severe blow to be expected in use is by the head or body of an auto passenger, and this blow is from a known direction inside the car.

EXAMPLE II

A safety-glass laminate was prepared using standard thickness glass 0.120 inch thick as the exterior laminae. The interior lamina was formed by superimposing two sheets, one being a 15.8 mil thick sheet of polyvinyl butyral having a hydroxyl content of 25.3% calculated as polyvinyl alcohol plasticized with 43.7 parts triethylene glycol di(2-ethyl butyrate) per 100 parts polyvinyl butyral, and the other being a 15.8 mil thick sheet of polyvinyl butyral having a hydroxyl content of 19.8% calculated as polyvinyl alcohol plasticized with 47.2 parts triethylene glycol di(2-ethyl butyrate) per 100 parts polyvinyl butyral. A series of these laminae were pressed together in the conventional way to form a series of safety-glass sheets, each 12 inches square. A series of control samples 12 inches square was prepared using 0.120 inch thick glass outside laminae and an interlayer of 31.6 mil thick polyvinyl butyral having a hydroxy content of 22.5% calculated as polyvinyl alcohol plasticized with 45.5 parts triethylene glycol di(2-ethyl butyrate) per 100 parts polyvinyl butyral. In the following strength tests, shown in Table No. II, the composite sheet was struck from the side having the hydroxyl content of 25.3% calculated as polyvinyl alcohol. The drop heights recorded are those which produced a 2 inch tear in the safety-glass using a two pound solid steel ball.

*Table No. II*

| Temperature | | Break Height, ft. | |
|---|---|---|---|
| °C. | °F. | 31.6 Mil Control | Two 15.8 Mil Composite |
| −18 | 0 | 5.3 | 8.0 |
| 0 | 32 | 14.4 | 18.0 |
| +15.2 | 59 | 20.0 | 22.3 |
| +25 | 77 | 20.5 | 25.5 |
| +32 | 90 | 18.0 | 25.6 |
| +40 | 104 | 16.3 | 19.0 |
| +49 | 120 | 10.0 | 11.8 |

The temperatures 0° F. and 120° F. used in the examples correspond to the extremes in temperature used in the American Standard Safety Code, 226, 1–1950. However, a 2-pound ball was used rather than the ½ pound ball specified in the code because the break heights of these laminates with the ½ pound ball were greater than those available for use in making these tests.

It has been shown that the laminates of this invention give a greater strength over a wider temperature range than the conventional laminates.

It has been found that polyvinyl butyral having a hydroxyl content of from 16% to 25% calculated as vinyl alcohol is suitable for use in the present invention. If the hydroxyl content calculated as percent vinyl alcohol drops below 16% there is likely to be a problem of the plasticizer exuding so that the sheet cannot be shipped for later use. Furthermore, if the hydroxyl content goes above 25% calculated as percent vinyl alcohol the sheet might develop a blue haze which limits its usefulness for automotive windshield purposes.

The interlayers used in this invention must be thick enough to have sufficient strength to be handled, which, from a practical point of view, means that interlayer sheets thinner than 10 mils cannot be used. There is no real upper limit to the thickness of interlayers which can be used. Current industry practice is to use one 15 mil interlayer. The invention is useful in laminating conventional glass of 0.120 to 0.125 inch as well as thinner glass sheets. As is pointed out in U.S. Patent No. 2,946,711 there are numerous safety advantages to be obtained by using glass sheets of 0.050 to 0.100 inch thickness as opposed to the conventional 0.120 inch to 0.125 inch thickness while using an interlayer thicker than normal which ranges up to 0.060 inch in thickness. Obviously, this invention lends itself to such a modification of the relative thickness of the layers by using two 30 mil interlayers of the varying composition above disclosed.

We claim:
1. A safety-glass laminate having two outer layers of glass and a central layer comprising two superimposed interlayers, each of said interlayers having a thickness of at least about 10 mils, the first of said two interlayers being formed of plasticized polyvinyl butyral having a hydroxyl content of over 16% calculated as percent vinyl alcohol, the second of said two interlayers being formed of plasticized polyvinyl butyral having a hydroxyl content of less than 25% calculated as percent vinyl alcohol, the said first interlayer having a hydroxyl content at least 2.5% less than said second layer.

2. The laminate of claim 1 wherein the amount of plasticizer present is from 34 parts to 52 parts based on 100 parts of polyvinyl butyral present.

3. The laminate of claim 2 wherein the thickness of each interlayer varies from about 10 to about 30 mils in thickness.

4. The laminate of claim 3 wherein the glass layers are between 0.050 inch and about 0.125 inch thick.

5. The laminate of claim 4 wherein the polyvinyl butyral layers have hydroxyl contents, calculated as percent vinyl alcohol, within 5.5% of each other.

References Cited by the Examiner
UNITED STATES PATENTS 2,526,728   10/50   Burk et al. _____ 154—2.77

EARL M. BERGERT, *Primary Examiner.*